United States Patent
Matsubara

(10) Patent No.: US 6,313,054 B1
(45) Date of Patent: Nov. 6, 2001

(54) SILICON NITRIDE SINTERED BODY, METHOD FOR MANUFACTURING THE SAME, AND CUTTING INSERT FORMED OF THE SINTERED BODY

(75) Inventor: Masaru Matsubara, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 09/637,901

(22) Filed: Aug. 14, 2000

Related U.S. Application Data

(62) Division of application No. 09/212,285, filed on Dec. 16, 1998, now Pat. No. 6,162,386.

(30) Foreign Application Priority Data

Dec. 26, 1997 (JP) ..................................... 9-360547

(51) Int. Cl.[7] ................................................. C04B 35/587
(52) U.S. Cl. ........................ 501/97.1; 501/97.2; 501/97.3
(58) Field of Search ................. 501/97.1, 97.2, 501/97.3

(56) References Cited

U.S. PATENT DOCUMENTS

| | | | |
|---|---|---|---|
| 5,045,513 | 9/1991 | Mizuno et al. | 501/98 |
| 5,229,046 | * 7/1993 | Watanabe et al. | 501/97.2 |
| 5,264,294 | * 11/1993 | Noel et al. | 428/561 |
| 5,264,297 | 11/1993 | Jindal et al. | |
| 5,370,716 | * 12/1994 | Mehrotra et al. | 51/293 |
| 5,382,273 | 1/1995 | Mehrotra et al. | 51/307 |
| 5,525,134 | 6/1996 | Mehrotra et al. | 51/307 |
| 5,635,431 | * 6/1997 | Ikeda et al. | 501/97.3 |
| 6,232,252 | * 5/2001 | Kim et al. | 501/97.2 |

FOREIGN PATENT DOCUMENTS

| | | |
|---|---|---|
| 4-201003 | * 7/1992 | (JP) . |
| 4-357174 | * 12/1992 | (JP) . |
| 8-503664 | * 4/1996 | (JP) . |
| 94/16023 | * 7/1994 | (WO) . |

* cited by examiner

Primary Examiner—Karl Group
(74) Attorney, Agent, or Firm—Dougherty & Troxell

(57) ABSTRACT

The present invention provides a silicon nitride sintered body having characteristics such as excellent wear resistance, a method for manufacturing the sintered body, and a cutting insert formed thereof. The silicon nitride sintered body is formed of a polycrystalline sintered body of predominantly $\beta$-$Si_3N_4$, wherein the oxygen content is 1.2–1.5 wt. %. The method for manufacturing the silicon nitride sintered body includes the following steps: adding an organic binder to a composition containing silicon nitride as an essential component and exhibiting a theoretical oxygen content of 2.0–3.0 wt. %; heating to remove the binder; introducing an oxygen-containing gas so as to control the carbon content to 0.10–0.60 wt. %; and sintering a resultant compact in an nitrogen atmosphere to control the oxygen content to 1.2–1.5 wt. %. The cutting insert of the present invention has excellent wear resistance.

2 Claims, 1 Drawing Sheet

◎ : Si₃N₄
○ : SINTERING AID
∘ : CARBON

SILICON NITRIDE SINTERED BODY, METHOD FOR MANUFACTURING THE SAME, AND CUTTING INSERT FORMED OF THE SINTERED BODY

RELATED APPLICATION

This is a Divisional application of U.S. Ser. No. 09/212,285, filed Dec. 16, 1998, now U.S. Pat. No. 6,162,386 entitled SILICON NITRIDE SINTERED BODY, METHOD FOR MANUFACTURING THE SAME, AND CUTTING INSERT FORMED OF THE SINTERED BODY, and currently pending.

BACKGROUND OF THE INVENTION

1. Field of the Invention

The present invention relates to a silicon nitride sintered body used for wear-resistant parts such as cutting inserts, bearings, and balls; a method for manufacturing the silicon nitride sintered body; and a cutting insert formed of the silicon nitride sintered body.

2. Background Art

Conventionally, silicon nitride sintered bodies predominantly containing silicon nitride and having an excellent strength have been used for cutting inserts, wear-resistant parts, etc.

In recent years, for the case where silicon nitride is used for cutting inserts, there has been proposed a technique of decreasing the amount of a sintering aid (an oxide) which is added to the essential component, in order to enhance wear resistance of the sintered body (See PCT Kohyo Publication 8-503664 or U.S. Pat. No. 5,525,134). As disclosed therein, a sintered body contains at least about 85 volume percent (vol. %) silicon nitride and less than 5 vol. % intergranular phase. The ceramic has greater than 0.2 weight percent (wgt. %) magnesia, greater than 0.2 wgt. % yttria wherein the sum of magnesia and yttria is less than 5 wgt. %. The ceramic also includes between 1.3 wgt. % to 2.2 wgt. % oxygen.

However, with the conventional cutting insert, there is a drawback that an extreme decrease in the amount of the sintering aid to be added renders sinterability lower than expected and decreases wear resistance and chipping resistance of the sintered body.

SUMMARY OF THE INVENTION

The present invention was made in view of the foregoing, and an object of the present invention is to provide a silicon nitride sintered body having properties such as excellent wear resistance and a method for manufacturing the same. The present invention also provides a cutting insert formed of the sintered body.

According to a first aspect of the present invention, there is provided a polycrystalline sintered body comprising predominantly $\beta$-$Si_3N_4$, i.e. between about 95 to about 97% by volume, wherein the oxygen content is 1.2–1.5 wt. %.

The silicon nitride sintered body of the first aspect of this invention has a dense texture, high hardness, and excellent wear resistance and chipping resistance.

According to a second aspect of the present invention, there is provided a method for manufacturing the above-described silicon nitride sintered body including the following steps: adding an organic binder to a composition containing silicon nitride as an essential component and exhibiting a theoretical oxygen content of 2.0–2.3 wt. %; forming a shaped or pressed body therefrom; heating to remove the binder (e.g., forming a calcined body); introducing an oxygen-containing gas so as to control the carbon content to 0.10–0.60 wt. % (e.g., cooling the calcined body); and sintering the resultant compact in a nitrogen atmosphere to control the oxygen content to 1.2–1.5 wt. % (e.g., primary and secondary sintering steps).

In the method of manufacturing the sintered body of this invention, when primary sintering is performed under pressurization, decomposition of silicon nitride is prevented. Thus, high-temperature sintering is realized. Moreover, pores are effectively closed by the high-temperature sintering at, for example, subsequent secondary sintering through HIP.

According to a third aspect of the present invention, there is provided a cutting insert formed of the silicon nitride sintered body of the first aspect.

The cutting insert of the third aspect of this invention has a dense texture, high hardness, and excellent wear resistance and chipping resistance.

BRIEF DESCRIPTION OF THE DRAWINGS

Various other objects, features, and many of the attendant advantages of the present invention will be readily appreciated as the same become better understood by reference to the following detailed description of the preferred embodiment in connection with the accompanying drawings, in which.

DETAILED DESCRIPTION OF THE INVENTION AND PREFERRED EMBODIMENT THEREOF

The polycrystalline sintered body of the present invention is predominantly $\beta$-$Si_3N_4$, wherein the oxygen content is between 1.2–1.5 wt. %.

As clarified in the following Examples, the silicon nitride sintered body of the present invention has a dense texture, high hardness value, and excellent wear resistance and chipping resistance, since the sintered body has an appropriately controlled oxygen content of 1.2–1.5 wt. %. The sintered body is also characterized as having minipores of 10 microns or less observable in an amount of 0.02% by volume or less.

The method for manufacturing the above-described silicon nitride sintered body according to the present invention comprises the following steps: adding an organic binder to a composition containing silicon nitride as an essential component and exhibiting a theoretical oxygen content of 2.0–2.3 wt. %; forming a shaped or pressed body therefrom; heating to remove the binder (e.g., forming a calcined body); introducing an oxygen-containing gas so as to control the carbon content to 0.10–0.60 wt. % (e.g., cooling the calcined body); and sintering the resultant compact in a nitrogen atmosphere to control the oxygen content to 1.2–1.5 wt. % (e.g., primary and secondary sintering steps).

In the present invention, a sintering aid is added in a minimum amount that enables sintering so that the texture is densified and a grain boundary phase (glass phase) is reacted with carbon remaining in the compact, to thereby decrease the amount of the grain boundary phase.

Figure 1:
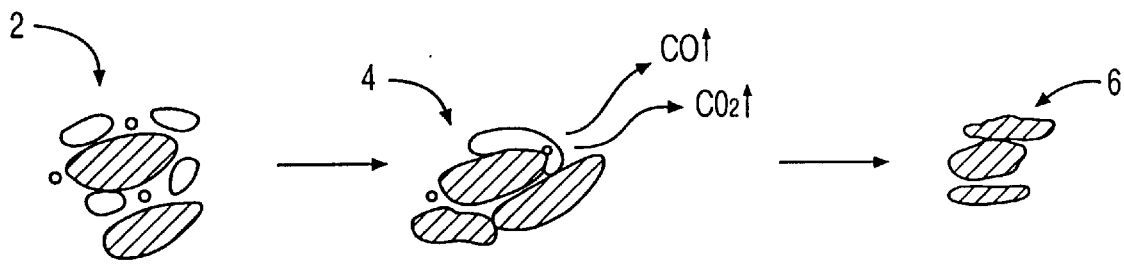
FIG. 1 is an explanatory view showing the change of texture of the sintered body during a firing step, etc.

Specifically, as schematically shown in FIG. 1, a calcined body incorporated with a predetermined amount of carbon undergoes primary and secondary sintering to remove carbon in the forms of carbon dioxide and carbon monooxide by combining with oxygen in order to perform dense sintering. Thus, a silicon nitride sintered body having high density and excellent wear resistance can be obtained, since decrease of a grain boundary phase and densification are simultaneously attained in the above-described process.

Reasons for limiting the above-described values will next be described.

(1) Theoretical oxygen content; 2.0–2.3 wt. %

The theoretical oxygen content relates to an amount of a sintering agent. When the content is less than 2.0 wt. %, densification is difficult, whereas when it is in excess of 2.3 wt. %, a grain boundary predominates to lower the wear resistance of the sintered body.

(2) Carbon content; 0.10–0.60 wt. %

When the carbon content in the calcined body is less than 0.10 wt. %, reaction to decrease a grain boundary phase is insignificant and the amount of a grain boundary phase therefore becomes considerably high to lower the wear resistance of the sintered body, whereas when it is in excess of 0.60 wt. %, the wear resistance of the sintered body decreases.

(3) Oxygen content; 1.2–1.5 wt. %

When the oxygen content is less than 1.2 wt. %, a grain boundary is formed in an excessively low amount to result in poor densification, whereas when it is in excess of 1.5 wt. %, the wear resistance of the sintered body decreases.

In the method for manufacturing the silicon nitride sintered body of the present invention, sintering in a nitrogen atmosphere is preferably performed under pressurization.

The present invention exemplifies conditions for sintering in a nitrogen atmosphere. For example, primary sintering performed under pressurization of several atm prevents silicon nitride from decomposing to enable sintering at high temperature. Moreover, pores are effectively closed by the high-temperature sintering in subsequent secondary sintering performed through, for example, HIP (hot isostatic press).

In the method for manufacturing the silicon nitride sintered body of the present invention, preferably, a microcrystalline-wax-type organic binder is used as an organic binder.

The present invention exemplifies species of the organic binder, and a microcrystalline-wax-type organic binder may be used as the organic binder. The use of the organic binder advantageously enhances flowability of powders and strength of shaped or pressed bodies.

In the method for manufacturing the silicon nitride sintered body of the present invention, an oxygen-containing gas is preferably introduced in a cooling step performed after removal of the organic binder by heating.

The present invention exemplifies timing to introduce the oxygen-containing gas, which is performed in a cooling step performed after removal of the organic binder by heating. This method enables simultaneous introduction of the oxygen-containing gas and cooling after calcination and facilitates operation steps. Also, carbon is effectively incorporated into a calcined body by introducing the oxygen-containing gas in the cooling step. Furthermore, the amount of carbon to be incorporated may be easily regulated by regulating conditions (e.g., flow rate) of the oxygen-containing gas to be introduced.

In the method for manufacturing the silicon nitride sintered body of the present invention, air is used as the oxygen-containing gas.

The present invention exemplifies species of the oxygen-containing gases, and use of air facilitates the manufacturing steps.

The cutting insert of the present invention has a dense texture, high hardness value, and excellent wear resistance and chipping resistance, since the sintered body that constitutes the cutting insert has an appropriately controlled oxygen content of 1.2–1.5 wt. %.

Embodiments of the invention, i.e., the silicon nitride sintered body of the present invention, the method for manufacturing the sintered body, and inserts made of the silicon nitride sintered body, will be described.

a) First is described the method for manufacturing the silicon nitride sintered body in the present Example.

$\alpha$-$Si_3N_4$ having an average grain size of 1.0 $\mu$m or less (oxygen content: 1.3 wt. %) as an essential component and MgO, $Al_2O_3$, and $Yb_2O_3$, each having an average grain size of 1.0 $\mu$m or less and serving as a sintering aid, were weighed at ratios specified in Table 1 shown below. The ratio of raw materials was determined such that the theoretical oxygen content in the weighed composition was regulated to 2.0–2.3 wt. %.

The thus-weighed material was mixed with ethanol as a solvent for 96 hours by use of an $Si_3N_4$ ball and a pot having an inner wall made of $Si_3N_4$, so as to form a slurry.

The slurry was passed through a 325-mesh-sieve, and a microcrystalline-wax-type organic binder dissolved in ethanol was added in an amount of 5.0 wt. % to the sieved slurry. The resultant mixture was spray-dried.

The obtained granulated powder was press-shaped to a shape identified as SNGN120408 (ISO standard), then the compact was placed in a heating apparatus and calcined. The calcination was performed at 600° C. for 60 minutes in a nitrogen atmosphere to dewax.

Moreover, in a cooling step during calcination air was introduced into the heating apparatus in an amount of 3–60 L/min as specified in Table 1, such that the carbon content in the dewaxed compact was regulated to 0.10–0.60 wt. %.

Primary sintering was then performed at 1800–1900° C. for 240 minutes in a nitrogen atmosphere having a predetermined pressure of 3 atm.

Subsequently, secondary sintering was performed through HIP to finally obtain the silicon nitride sintered body. The secondary sintering was performed at 1600–1700° C. for 120 minutes in a nitrogen atmosphere having a predetermined pressure of 1000 atm.

The oxygen content of the sintered body was regulated to 1.2–1.5 wt. % through combination of primary and secondary sintering steps.

An X-ray diffraction analysis confirmed that $\alpha$-$Si_3N_4$ used as a raw material had been converted to $\beta$-$Si_3N_4$ through the sintering steps.

The thus-obtained silicon nitride sintered bodies of the present Examples are polycrystalline, comprise predominantly $\beta$-$Si_3N_4$ in an amount of 95–97 vol. %, and have an oxygen content of 1.2–1.5 wt. %.

Therefore, the sintered bodies have excellent characteristics such as a dense texture, high hardness, high fracture toughness, and high wear resistance.

b) Next, there are described Test Examples to confirm effects of the silicon nitride sintered bodies in the present Examples.

Each of the silicon nitride sintered bodies obtained through the above-described method for manufacturing was processed by polishing to form cutting inserts having a shape identified as SNGN120408 (ISO standard). These cutting inserts were used as sample Nos. 1 to 5.

As Comparative Examples, silicon nitride sintered bodies were manufactured and similarly processed in accordance with compositions and conditions specified in Table 1 to thereby serve as sample Nos. 6 and 7, each of which has a carbon content (residual carbon) and an oxygen content outside the scope of the present invention.

The below-described measurements and evaluations of (1) to (4) were conducted on the above-described sample Nos. 1 to 7.

(1)<Measurement of the carbon content (residual carbon content) after calcination>

Each of the calcined bodies was crushed to a particle size of φ1 [mm] or less. The crushed product was weighed through burning in an oxygen stream-infrared absorption method in accordance with JIS-Z2615.

(2)<Measurement of the oxygen content in the sintered bodies>

Each of the sintered bodies was crushed to a particle size of φ1 [mm] or less and fused by heating in an inert gas. The determination was performed through a non-dispersive infrared absorption method.

(3)<Physical properties>

(Apparent porosity)

A cross-section of each sample was mirror-polished and the surface was examined by use of a metallurgical microscope to thereby classify apparent porosity in accordance with CIS-006B-1983, which is registered as "Classification Standards for Apparent Porosity of Cemented Carbides" and corresponds to ISO 4505.

(Vickers hardness Hv)

Measurement conditions: depressor-indentation pressure; 30 kg and indentation time; 15 sec.

(Fracture toughness Kc)

Measured through an IF method specified in JIS R 1607.

(4)<Evaluation of cutting performance>

In accordance with the below-described conditions, an edge face of a cylindrical cast iron workpiece was continuously machined under dry conditions and the maximum wear depth ($VB_{max}$) in flank wear depths (VB) (see FIG. 2) was measured at the tip of a cutting tool after 20 minutes' processing.

Workpiece material; JIS FC200

Workpiece shape; outer diameter φ240 mm×inner diameter φ180 mm

Cutting speed; V=300 m/min

Feed per revolution; f=0.34 mm/rev

Depth of cut; d=0.2 mm

Measurement results of the above-described (1) to (4) are shown in Table 2 together with calcination conditions (heating conditions for removing an organic binder), cooling conditions (flow rate of air feeding for cooling the calcined body), conditions of primary sintering (temperature conditions of primary sintering), and conditions of secondary sintering (heating conditions at HIP), as shown in Table 3.

TABLE 1

| | | Feed composition [wt. %] | | | | |
|---|---|---|---|---|---|---|
| | | Sintering aid | | | Essential component | Theor. oxygen |
| | | MgO | $Al_2O_3$ | $Yb_2O_3$ | $Si_3N_4$ | content [wt. %] |
| Example | 1 | 0.3 | 1 | 3 | 95.7 | 2.19 |
| | 2 | 0.3 | 1 | 3 | 95.7 | 2.19 |
| | 3 | 0.3 | 1 | 3 | 95.7 | 2.19 |
| | 4 | 0.5 | 1 | 1 | 97.5 | 2.06 |
| | 5 | 1 | 1 | 1 | 97.0 | 2.25 |
| Comp. Ex. | 6 | 0.3 | 1 | 3 | 95.7 | 2.19 |
| | 7 | 0.3 | 1 | 3 | 95.7 | 2.19 |

TABLE 2

| | | Heating condition at calcination [° C.] | Cooling condition at calcination Air flow rate [L/min] | Sintering conditions | |
|---|---|---|---|---|---|
| | | | | Primary sintering [° C.] | Secondary sintering (HIP) [° C.] |
| Example | 1 | 600 | 3 | 1850 | 1600 |
| | 2 | 600 | 30 | 1850 | 1600 |
| | 3 | 600 | 60 | 1850 | 1600 |
| | 4 | 600 | 30 | 1850 | 1600 |
| | 5 | 600 | 30 | 1900 | 1700 |
| Comp. Example | 6 | 600 | 0 | 1900 | 1700 |
| | 7 | 600 | 100 | 1850 | 1600 |

TABLE 3

| | | (1) Residual carbon content [wt. %] | (2) Oxygen content of sintered body | (3) | | | (4) Cutting performance $VB_{max}$ wear [mm] |
|---|---|---|---|---|---|---|---|
| | | | | Micropore* | Hardness Hv | Fracture toughness Kc | |
| Ex. | 1 | 0.42 | 1.20 | A02 | 1550 | 7.5 | 0.31 |
| | 2 | 0.25 | 1.37 | A02 | 1580 | 7.3 | 0.43 |
| | 3 | 0.11 | 1.48 | A02 | 1600 | 7.0 | 0.52 |
| | 4 | 0.22 | 1.22 | A02 | 1650 | 6.7 | 0.36 |
| | 5 | 0.36 | 1.25 | A02 | 1640 | 6.8 | 0.36 |
| Comp. Ex. | 6 | 0.68 | 1.16 | A08 | 1340 | — | chipping |
| | 7 | 0.09 | 1.54 | A02 | 1430 | 7.9 | 0.94 |

*A02 refers to the case in which pinholes having a size of 10 μm or less are observed in amounts of 0.02% by volume.
A08 refers to the case in which pinholes having a size of 10 μm or less are observed in amounts of 0.6% by volume.

As is apparent from Tables 1 to 3, sample Nos. 1 to 5, which fall within the scope of the present invention, are manufactured by the following steps: adding a sintering aid to silicon nitride as an essential component to thereby prepare a composition having a theoretical oxygen content of 2.0–2.3 wt. %; adding a microcrystalline-wax-type organic binder thereto to form a compact; heating the compact to remove the organic binder (calcination); cooling by introducing air so as to regulate the carbon content to about 0.10 to about 0.60 wt. %; sintering under pressurization in a nitrogen atmosphere (primary sintering) to regulate the oxygen content of the sintered body to 1.2–1.5 wt. %; and secondarily sintering through HIP.

Thus, the silicon nitride sintered bodies of sample Nos. 1 to 5 have an apparent porosity (micropore) of A02 (classification standards, CIS 006B-1983) and sufficient density. The hardness Hv is as high as 1550 or more and the fracture toughness Kc is as high as 6.7 or more. Furthermore, with regard to the cutting performance thereof, the sintered bodies have a VBmax wear depth of as low as 0.52 mm or less and sufficient wear resistance.

In contrast, sample No. 6 serving as a Comparative Example, which was calcined without air flow, has a residual carbon content as high as 0.68 wt. %. Therefore, the oxygen content in the silicon nitride sintered body is as low as 1.16 wt. %, which results in the apparent porosity (micropore) of A08 (classification standards, CIS 006B-1983) and poor density. The hardness Hv is as low as 1340. Moreover, disadvantageous chipping occurs during cutting.

Sample No. 7 serving as a Comparative Example, which was calcined under air flow of as much as 100 L/min, has a residual carbon content as low as 0.09 wt. %. Therefore, the oxygen content in the silicon nitride sintered body is as high as 1.54 wt. %, which results in a hardness Hv as low as 1430. Furthermore, with regard to the cutting performance thereof, the sintered body has a VBmax wear depth of as much as 0.94 mm or less and poor wear resistance.

FIG. 1 is a schematic illustration which illustrates the change in texture of a sintered body during the firing step. As illustrated therein, a calcined body of silicon nitride, a sintering aid and carbon are combined (see 2). During sintering (4), the generation of a grain boundary phase progresses to densification (6). During sintering, carbon and oxygen are driven off as carbon dioxide and carbon monoxide until densification is complete.

Figure 2:
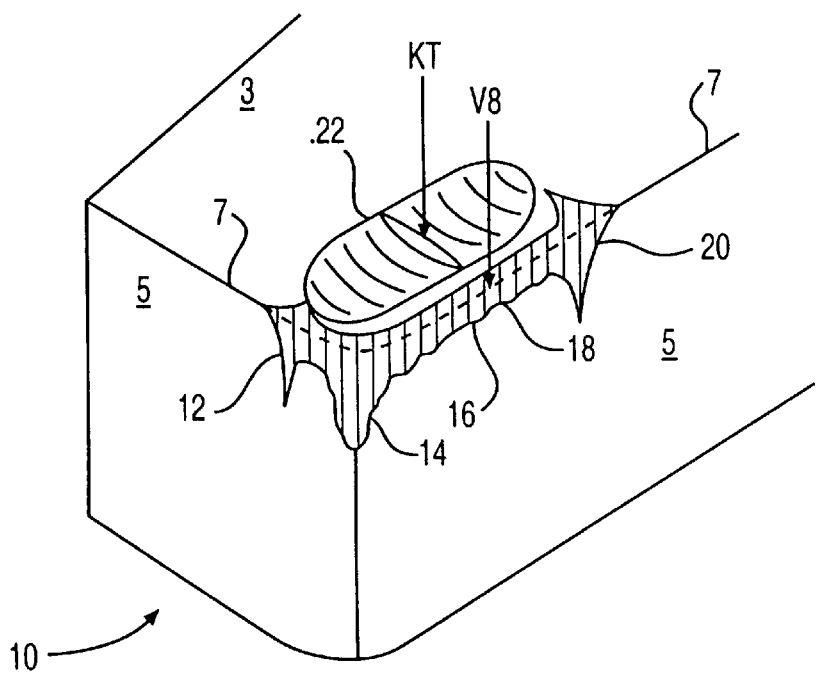
FIG. 2 is an explanatory view showing different types of wear.

As illustrated in FIG. 2, a ceramic metal cutting insert is composed of silicon nitride ceramic material as disclosed herein. The insert 10 is particularly useful in roughing and interrupted cutting of metals where a combination of high toughness and high wear resistance is required.

The insert 10 includes a rake face 3 over which chips formed during machining flow. The insert 10 also includes flank faces 5 and cutting edges 7 which are formed at the junction of the rake face 3 and flank faces 5. As illustrated the rake face 3 includes face or crater wear 22 and crater wear amount KT. FIG. 2 also illustrates flank wear 18 and wear amount VB. The figure also illustrates nose (triangular wear 14, flank wear 16, 18 and end cutting edge wear 12.

Obviously, numerous modifications and variations of the present invention are possible in light of the above teachings. It is therefore to be understood that within the scope of the claims, the present invention may be practiced other than as specifically described herein.

The present disclosure relates to subject matter contained in Japanese Patent Application No. HEI 9-360547, filed on Dec. 26, 1997, which is expressly incorporated herein by reference in its entirety.

What is claimed is:

1. A polycrystallline sintered body comprising $\beta$-$Si_3N_4$ in an amount of between about 95 to about 97 percent by volume, a sintering aid selected from the group consisting of MgO, $Al_2O_3$ and $Yb_2O_3$ and mixtures thereof, an oxygen content of between about 1.2–1.5 wt. % and wherein micropores of 10 microns or less are observable in an amount of 0.02 % by volume or less.

2. A polycrystalline sintered body made by:

adding a carbon containing organic binder to a composition containing silicon nitride as an essential component and exhibiting a theoretical oxygen content of 2.0–2.3 wt. %;

forming a pressed body therefrom;

heating to remove the organic binder;

introducing an oxygen-containing gas to thereby control the carbon content to 0.10–0.60 wt. %; and, sintering in a nitrogen atmosphere to control the oxygen content to 1.2–1.5 wt. %.

* * * * *